United States Patent
Unnikrishnan et al.

(10) Patent No.: US 9,003,453 B2
(45) Date of Patent: Apr. 7, 2015

(54) SYSTEM AND METHOD FOR SHARING EVENT INFORMATION IN A DIGITAL TELEVISION SYSTEM

(71) Applicants: Dhanya Unnikrishnan, Thrissur (IN); Mohammed Junaid Kottikulam, Kasaragod (IN); Saira Thampi, Perumbavoor (IN); Aishwarya Valsalan, Cochin (IN)

(72) Inventors: Dhanya Unnikrishnan, Thrissur (IN); Mohammed Junaid Kottikulam, Kasaragod (IN); Saira Thampi, Perumbavoor (IN); Aishwarya Valsalan, Cochin (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 13/887,603

(22) Filed: May 6, 2013

(65) Prior Publication Data
US 2014/0282712 A1    Sep. 18, 2014

(30) Foreign Application Priority Data
Mar. 14, 2013 (IN) .......................... 1072/CHE/2013

(51) Int. Cl.
*H04N 7/16* (2011.01)
*H04H 40/00* (2008.01)
*H04M 3/42* (2006.01)
*H04N 21/4788* (2011.01)
*H04N 21/4786* (2011.01)
*H04N 21/478* (2011.01)
(Continued)

(52) U.S. Cl.
CPC ....... *H04N 21/4788* (2013.01); *H04N 21/4786* (2013.01); *H04N 21/4758* (2013.01); *H04N 21/4756* (2013.01); *H04N 21/478* (2013.01); *G06Q 30/0282* (2013.01); *H04L 51/10* (2013.01); *H04L 51/38* (2013.01); *H04L 51/06* (2013.01); *H04L 51/063* (2013.01); *H04L 12/5895* (2013.01); *H04M 1/72547* (2013.01)

(58) Field of Classification Search
CPC .......... H04M 1/72547; H04L 12/5895; H04L 51/38; H04L 51/06; H04L 51/063; H04L 51/10; G06F 17/30578; G06Q 30/02; H04N 21/252; H04N 21/44222; H04N 21/4758; H04N 21/4756; H04N 21/478; H04N 21/4786; H04N 21/4788; G05Q 30/0282
USPC ..................... 725/34, 51, 61, 62, 81, 83, 110; 709/206; 455/3.06, 466, 2.01, 412.1, 455/412.2; 348/563, 564, 569, 589; 715/739, 752
See application file for complete search history.

(56) References Cited

U.S. PATENT DOCUMENTS 8,006,270 B2    8/2011    Martini et al.
2005/0246757 A1    11/2005    Relan et al.
(Continued)

*Primary Examiner* — Hoang-Vu A Nguyen-Ba
(74) *Attorney, Agent, or Firm* — Finnegan, Henderson, Farabow, Garrett & Dunner LLP

(57) ABSTRACT

Disclosed herein are broadcast receivers and methods for sharing event information. At a sender end, event information for a broadcast is collected after receiving a command from the sender and a message is created that includes the event information. The sender may then select one or more contacts with whom to share the event information. Thereafter, the message and information on the contact is transmitted to a mobile device of the sender over a short range communication link. The message may then be automatically forwarded from the mobile device to the selected recipients. At the recipient end, the message is received from the mobile device of the recipient over a short range communication link and processed to determine if the message is a recommendation message. If so, the contents of the message are extracted and displayed on a television display of the recipient.

29 Claims, 11 Drawing Sheets

| (51) | Int. Cl. | |
|---|---|---|
| | G06Q 30/02 | (2012.01) |
| | H04L 12/58 | (2006.01) |
| | H04N 7/10 | (2006.01) |
| | H04N 7/18 | (2006.01) |
| | G06F 15/16 | (2006.01) |
| | G06F 3/00 | (2006.01) |
| | H04W 4/00 | (2009.01) |
| | H04N 5/445 | (2011.01) |
| | H04N 9/74 | (2006.01) |
| | H04N 21/475 | (2011.01) |
| | H04M 1/725 | (2006.01) |

(56) References Cited

U.S. PATENT DOCUMENTS

| | | | |
|---|---|---|---|
| 2010/0115037 A1* | 5/2010 | Hull et al. | 709/206 |
| 2010/0223131 A1* | 9/2010 | Scott et al. | 705/14.53 |
| 2010/0229212 A1* | 9/2010 | Liu et al. | 725/109 |
| 2011/0041153 A1* | 2/2011 | Simon et al. | 725/46 |
| 2012/0036543 A1 | 2/2012 | George et al. | |
| 2012/0124145 A1 | 5/2012 | Krietzman et al. | |
| 2013/0013700 A1* | 1/2013 | Sittig et al. | 709/206 |
| 2013/0014143 A1* | 1/2013 | Bhatia et al. | 725/13 |
| 2014/0009680 A1* | 1/2014 | Moon et al. | 348/563 |
| 2014/0067969 A1* | 3/2014 | Archibong et al. | 709/206 |

* cited by examiner

EVENT RECOMMENDATION

AN EVENT WAS RECOMMENDED BY <NAME OF RECOMMENDER>.
DO YOU WANT TO VIEW THE RECOMMENDATION?

● YES    ○ NO

FIG. 3

RECOMMENDED EVENT INFORMATION

THE FOLLOWING EVENT WAS RECOMMENDED BY <NAME OF RECOMMENDER>

| | |
|---|---|
| EVENT NAME | : <NAME OF THE RECOMMENDED EVENT> |
| SERVICE NAME | : <SERVICE NAME OF THE EVENT> |
| EVENT SCHEDULE | : <TIME AND DURATION OF THE EVENT> |
| EVENT DESCRIPTION | : <SHORT DESCRIPTION OF THE EVENT> |

○ SET REMINDER   ● FORWARD RECOMMENDATION

⊗ RECORD   ● EXIT

SYSTEM AND METHOD FOR SHARING EVENT INFORMATION IN A DIGITAL TELEVISION SYSTEM

CROSS-REFERENCE TO RELATED PATENT APPLICATION

The present application claims priority under 35 U.S.C. §119 to Indian Patent Application No. 1072/CHE/2013, filed Mar. 14, 2013, and entitled "SYSTEM AND METHOD FOR SHARING EVENT INFORMATION IN A DIGITAL TELEVISION SYSTEM." The aforementioned application is incorporated herein by reference in its entirety.

TECHNICAL FIELD

The present disclosure generally relates to Digital Television (DTV), and more specifically to methods and systems for sharing event information in a DTV system.

BACKGROUND

Television (TV) has been an important component of home entertainment for over half a century. TVs have survived the Internet and PC revolution. Watching TV today, however, bears little relation to a viewer's experience in the early days of TV. Modern TV systems provide significantly improved audio and video quality, stemming from significant technological improvements. Cable and satellite delivery systems offer the user hundreds of program choices, for example. Also today's user is provided with many options to control the viewing experience, such as the ability to view two or more programs simultaneously. Often, however, users may want to share TV program events with their contacts. Constant communication is a hallmark of the present age, and users may want to share TV program information with friends sharing common interests. That communication is likely desired while users are actually watching a program, or it may be stimulated by a trigger event such as a trailer or an advertisement of a program on the TV, or even by an off-line event, such as reading a program guide.

Conventional technology allows users to share such events by messaging or calling their contacts using cell phones, computers, or the like to pass along the required information. Those techniques are all relatively cumbersome, however. For messaging, the user needs to type in program specific information such as service name, event name, event time, and event description in order to adequately inform the recipient. The user may also share an event by first recording it in the TV's memory or in the memory of a set-top-box (STB) associated with the TV, and then uploading/sending the same via the Internet. All such current forms of sharing TV program information consume time and may also cause diversion or disruption for a user in watching an ongoing program. Additionally, some of these solutions require that the TV or STB be web-enabled.

Accordingly, there exists a need for improved techniques for sharing event information in a DTV system.

SUMMARY

According to an aspect of the disclosure, a broadcast receiver for enabling sharing of event information for a broadcast program is provided. The broadcast receiver may include at least one processor and a memory storing instructions to be executed by the at least one processor. The at least one processor may be configured by the instructions to collect event information for a broadcast event after receiving a command from a user. The at least one processor may be further configured to create a message that includes the event information, display a contact list of the user after receiving the command, receive selection of at least one contact from the contact list, and transmit the message and information on the selected at least one contact over a short range communication link to a mobile device of the user.

According to another aspect of the invention, a broadcast receiver for consuming shared event information is provided. The broadcast receiver may include at least one processor and a memory storing instructions to be executed by the at least one processor. The at least one processor may be configured by the instructions to receive a message that includes the shared event information for a broadcast event from a mobile device over a short range communication link. The at least one processor may be further configured to determine if the message is a recommendation and extract the contents of the message in response to determining that the message is a recommendation. The at least one processor may be further configured to display the contents of the message on a television display in a predefined format.

According to another aspect of the disclosure, a computer-implemented method for enabling sharing of event information is disclosed. The method may include collecting event information for a broadcast event after receiving a command from a user and creating, using at least one processor, a message that includes the event information. The method may further include displaying a contact list of the user after receiving the command, receiving selection of one or more contacts from the contact list, and transmitting the message and information on the one or more selected contacts over a short range communication link to a mobile device of the user. The mobile device of the user may then automatically forward the message to the one or more selected contacts.

According to another aspect of the disclosure, a computer-implemented method for consuming shared event information is disclosed. The method may include receiving a message from a mobile device over a short range communication link, wherein the message includes the shared event information for a broadcast event. Thereafter, the message may be processed to determine if the message is a recommendation and if the message is a recommendation, contents of the message may be extracted. Subsequently, the contents of the message may be displayed on a television display in a predefined format.

According to another aspect of the disclosure, a non-transitory computer-readable storage medium is disclosed that stores instructions that when executed by a processor enable the processor to implement a method for enabling sharing of event information. The method may include collecting event information for a broadcast event after receiving a command from a user and creating, using at least one processor, a message that includes the event information. The method may further include displaying a contact list of the user after receiving the command, receiving selection of one or more contacts from the contact list, and transmitting the message and information on the selected contact to a mobile device of the user over a short range communication link.

According to another aspect of the disclosure, a non-transitory computer-readable storage medium is disclosed that stores instructions that when executed by a processor enable the processor to display shared event information on a television display. The method may include receiving a message that includes the shared event information for a broadcast event from a mobile device over a short range communication link. Thereafter, the message may be processed to determine if the message is a recommendation. If the message is a recommendation, the contents of the message may be extracted and displayed on a television display in a predefined format.

It is to be understood that both the foregoing general description and the following detailed description are exemplary and explanatory only and are not restrictive of the disclosure, as claimed.

BRIEF DESCRIPTION OF THE FIGURES

FIG. 3 illustrates an exemplary message displayed on a DTV on a recipient side in accordance with an exemplary embodiment of the present disclosure.

FIG. 5 illustrates another exemplary message displayed on a DTV on the recipient side in accordance with an exemplary embodiment of the present disclosure.

Figure 1:
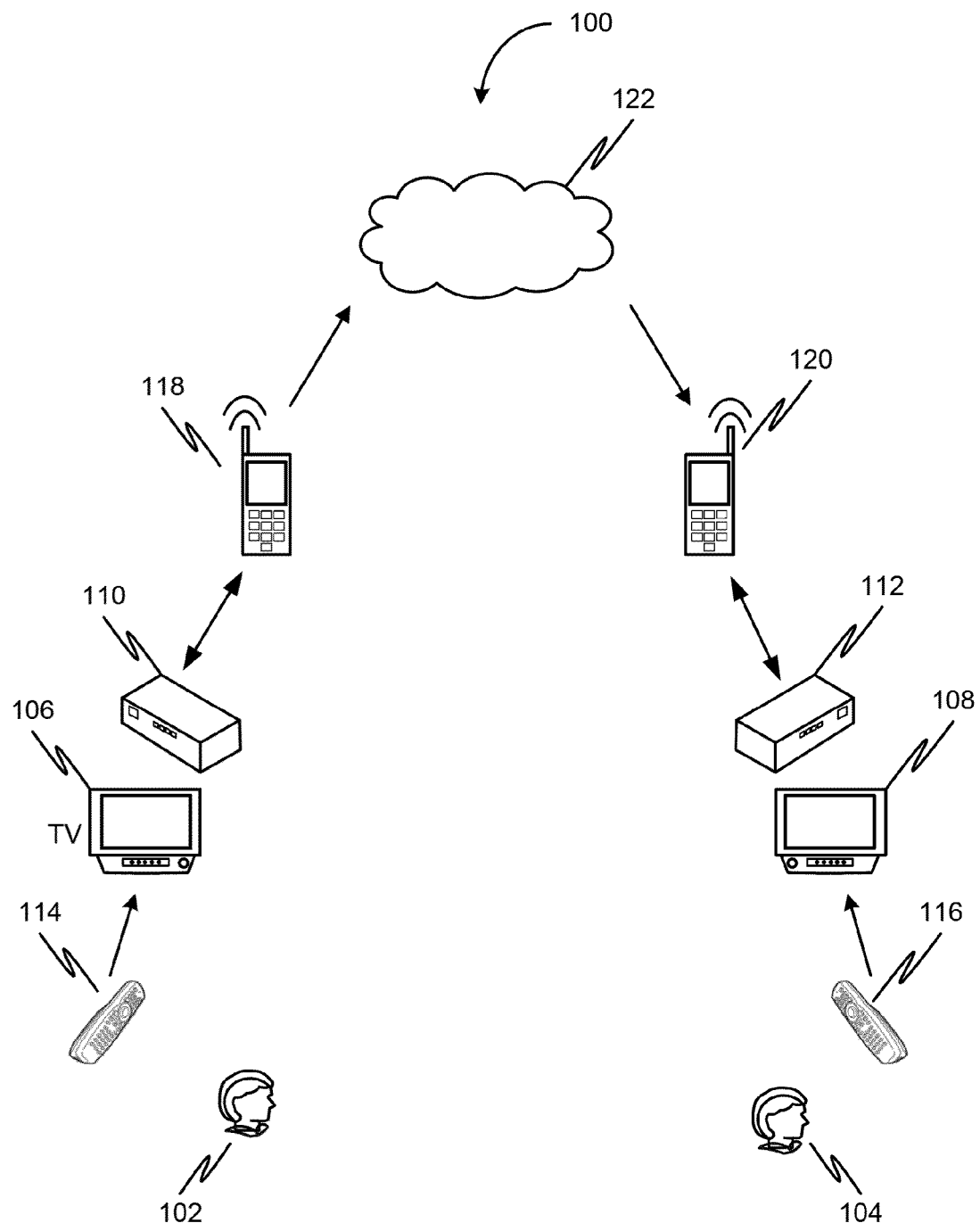
FIG. 1 illustrates an exemplary system for sharing event information according to an exemplary embodiment of the present disclosure.

While the invention is amenable to various modifications and alternative forms, specific embodiments are shown by way of example in the drawings and are described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION

In the following description, numerous specific details are set forth to provide a thorough understanding of the present disclosure. However, it will be clear to one skilled in the art that the present disclosure may be practiced without some or all of these details. In other instances, well known process steps have not been described in detail in order to avoid unnecessarily obscuring the present disclosure.

Exemplary embodiments illustrate a system and a method for enabling sharing of event information in a DTV system. In an exemplary embodiment, a first user selects an event of interest to be shared with one or more second users in a contact list. Information related to the selected program or event information may then be aggregated, for example, in a Set Top Box (STB) and sent to a mobile device such as a cell phone over a short range communication link such as, but not limited to, a BLUETOOTH™ connection, for transmission to the second users via a network. In other exemplary embodiments, selection and sharing of event information may be based on various interest groups and may take place automatically.

FIG. 1 illustrates an exemplary event sharing system 100 according to one embodiment of the present disclosure. As shown, two users 102 and 104, located remotely from each other, are watching DTV's 106, 108. Each user may have a remote control device 114, 116, used to select programming as well as to perform tasks such as recording a given program and the like. Each DTV 106, 108 may communicate with a programming provider, such as a cable TV or satellite system, using a STB 110, 112. Each STB 110, 112 may further include a communication module, explained in more detail below enabling it to communicate with a mobile device 118, 120, using a short-range communication link such as, for example, a BLUETOOTH™ link, a ZIGBEE™ link, or a short length data cable. Mobile devices 118, 120 may communicate with each other through a network 122. Exemplarily, network 122 may be a cellular network such as GSM or CDMA. Furthermore, mobile devices 118, 120, if they are cell phones, may also be equipped with "smartphone" capabilities, allowing them to communicate via some other network, such as the Internet. While FIG. 1 illustrates mobile devices 118, 120 as cell phones, it will be understood that mobile devices 118, 120 may be any digital device that is capable of communicating data to another device using a short-range communication link such as a BLUETOOTH™ link, a ZIGBEE™ link, Wireless LAN, Wi-Fi Direct link or the like. Examples of such digital devices may include laptops, PDAs, tablets, etc.

In event sharing system 100, users 102 and 104 may be in the same location or in remote locations. Remote locations may also include two rooms in the same house or two rooms in a hotel. Further, remote control devices 114, 116 are illustrated in FIG. 1 as ordinary TV remotes. However, remote control devices 114, 116 may not be limited to TV remotes in different exemplary embodiments. For example, in one embodiment, a mobile device 118 may serve the function of mobile device 118 and remote control device 114. Such a mobile device 118 (for example, a smartphone, a tablet, or any other mobile device) may communicate with STB 110 and DTV 106 to control STB 110 and DTV 106. The same may hold true for mobile device 120 which can take place of remote control device 116 to control STB 112 and DTV 108. Further, in some exemplary embodiments, STBs 110, 112 may be physically incorporated into DTVs 106 and 108, respectively, or DTVs 106, 108 may be integrated DTVs that have consolidated DTV and STB functionality in a single device.

DTVs 106, 108 may receive audio and video by a digitally processed multiplexed signal, as compared to analog channel separated signals used by traditional analog TV systems. Further, DTVs 106, 108 may support many different picture formats which can be broadly divided into two exemplary categories, High Definition Picture Format for the transmission of high-definition video and Standard-Definition Picture Format. For purposes of the present disclosure, DTVs 106, 108 may display either category, but any picture format can be involved. Further, STBs 110, 112 may store an Electronic Programming Guide (EPG) which may be an interactive program guide that includes information on broadcasted programs such as name of the program, time of the program, information about actors in the program, etc. In exemplary embodiments the EPG may also be stored in DTVs 106, 108. Exemplary operations of event sharing system 100 will be described next.

Suppose a first user 102 is watching a program or event or browsing through the EPG on DTV 106 and wants to share information about the program or event with one or more of his contacts. Exemplarily, the contact may be a second user 104. In one embodiment, user 102 may use the remote control device 114 to navigate to a "share" option on a menu displayed on DTV 106 to initiate the program information or event information sharing process. In another embodiment, user 102 may use a dedicated terminal or button (for example, a "share" button) on the remote control device 114 or on the DTV 106 or on the STB 110 to initiate the sharing process. It will be understood that similar actions may be initiated by the second user 104 for DTV 108. It will be further understood that each of the devices on user 102 side (or sender side) and user 104 side (or recipient side) may have similar capabilities, which are discussed in the next few paragraphs. Accordingly, all of the description, which is provided with reference to devices on the sender side, may be equally applicable to corresponding devices on the recipient side.

After selecting the program or event to be shared, user 102 may select user 104 from a contact list. An entry for user 104 in the contact list may include name of user 104 and other contact details such as, but not limited to, a mobile phone number and an email ID. The contact list may be stored on the STB 110 or a similar conveniently located conventional device and displayed on DTV 106 in response to the sharing process being initiated by user 102. User 102 may select user 104 from the contact list displayed on DTV 106. The contact list may also be stored on mobile device 118. Further, in some exemplary embodiments, the contact list may be displayed on mobile device 118 in response to user 102 initiating the sharing process and user 102 may select user 104 from the contact list directly on mobile device 118.

In some exemplary embodiments, STB 110 or DTV 106 may be adapted to communicate with mobile device 118 over one or more short range communication links employing technologies such as BLUETOOTH™ link, Ultra-Wide Band (UWB), and ZIGBEE™ link. Thus, STB 110 or DTV 106 need not have internet capabilities to communicate with mobile device 118. STB 110 may be synchronized with mobile device 118 for retrieving contact list information. Further, each time STB 110 connects to mobile device 118, a contact list stored in STB 110 may be updated to correspond to the latest contact list on mobile device 118. If the contact list is not stored in STB 110, a contact list object may be downloaded from mobile device 118 to STB 110. Exemplarily, if STB 110 is connected to mobile device 118 via BLUETOOTH™ link, STB 110 and mobile device 118 may employ the BLUETOOTH™ Phone Book Access Profile (PBAP) to sync and download the contact list or phone book. If mobile device 118 is not a cell phone but another digital device such as a laptop or tablet, the contact list or phone book may be stored in some suitable format so that it may be downloaded to STB 110. Additionally, in some exemplary embodiments, STB 110 and mobile device 118 may communicate via any short range communication link to download and synchronize the contact list. In other exemplary embodiments, STB 110 and mobile device 118 may be connected via a wired communication link such as a short length data cable to download and synchronize the contact list. For example, a wired communication link between STB 110 and mobile device 118 may be established through a Universal Serial Bus (USB) port provided on STB 110. Further, application code may be provided in STB 110 that when executed downloads and synchronizes the contact list of STB 110 with the contact list of mobile device 118.

After selecting user 104 from the contact list, user 102 may select an option to share the event information with user 104. In response, STB 110 may prepare a message in a predetermined format containing relevant information such as the event recommender, the recommended event, the service in which the event will be broadcasted, and the time slot and duration of the event, as well as a short description of the event itself. The short event description may include information about the event such as genre, actor, etc. An example of such a message format is explained in further detail in conjunction with FIG. 2 below. It will be noted that user 102 may select more than one contact from the displayed contact list. For example, in addition to selecting user 104, user 102 may select additional contacts with which the event information is to be shared.

STB 110 may send the formatted message to mobile device 118, for example, via a communication interface (for example, a BLUETOOTH™ interface) provided in STB 110. The formatted message sent by STB 110 to mobile device 118 may include one or more attributes or identifiers that enable mobile device 118 to determine that the message is a recommendation and to accordingly perform one or more actions. STB 110 may also include as part of the formatted message or send in a separate message, information on the selected contacts with which the event information is to be shared. In one embodiment, STB 110 may employ Message Access Profile (MAP), in which STB 110 acts as a Message Client Equipment (MCE) and mobile device 118 acts as a Message Sender Equipment (MSE). BLUETOOTH™ Message Access Profile may be employed by STB 110 to communicate the formatted message and recipient list to mobile device 118. If mobile device 118 is not within range of STB 110, STB 110 may queue up the message and send the message to mobile device 118 when mobile device 118 comes within range.

Having received the formatted message and the recipient list, mobile device 118 may transmit the formatted message to users in the recipient list. Mobile device 118 may automatically transmit the formatted messages to the recipients based on one or more attributes associated with the message and/or one or more identifiers associated with the message. For example, an identifier may be included with the message by STB 110 prior to sending the message to mobile device 118. Mobile device 118 may recognize that the message is sent by STB 110 based on the identifier and automatically transmit the message to the recipients in the recipient list. In another embodiment, mobile device 118 may detect one or more attributes of the message shown in FIG. 2 and determine that the message is a recommendation message and accordingly transmit the message to the recipients in the recipient list. Exemplarily, mobile device 118 may employ a cellular network such as GSM, CDMA, a broadband wireless network such as 3G, 4G LTE to transmit the formatted message to users in the recipient list. In some exemplary embodiments, mobile device 118 may transmit the formatted message to users in the recipient list by establishing a local area network connection with mobile devices of those users via Wi-Fi or another wireless communication medium. In another exemplary embodiment, two or more mobile devices may be connected to a Local Area Network (LAN) over an Ethernet cable.

At the recipient side, user 104's mobile device 120 may receive the formatted message and forward it to STB 112 over a short range communication link. STB 112 may receive the message via a communication interface (for example, a BLUETOOTH™ interface) available on STB 112 and process the message to determine if the message is a recommendation message. If STB 112 determines that the message is a recommendation message, the contents of the message may be extracted. Thereafter, the contents of the message may be displayed on DTV 108 in one of one or more predefined formats. Further, the received message may be displayed on a display screen of mobile device 120 and/or DTV 108 by STB 112 as discussed further with reference to FIGS. 4 and 5. If DTV 108 is not currently switched ON, STB 112 may store the message and display the message once DTV 108 is switched ON. In certain exemplary embodiments, STB 112 may not be in a communication range with mobile device 120. In such a scenario, mobile device 120 may transmit the received message to STB 112 when mobile device 120 and STB 112 are brought within a required communication range. Exemplary operations performed by devices on the recipient side are explained in further detail in conjunction with FIGS. 3, 4, 5, 7, 9, 10, and 11 below.

In another exemplary embodiment, STB 110 may provide an option of defining interest groups, consisting of groups of contacts. Rather than sending an event recommendation message to one individual, user 102 may select an interest group, thus transmitting the same message to multiple recipients without having to individually select every recipient.

In yet another exemplary embodiment, user 102 may be able to automate the sharing process. For example, user 102 may adjust certain settings on STB 110 such that STB 110 transmits event recommendation messages either to individual recipients or interest groups automatically, based on the type of event, such as the program name, actor identification, description keywords, or the like.

Figure 2:
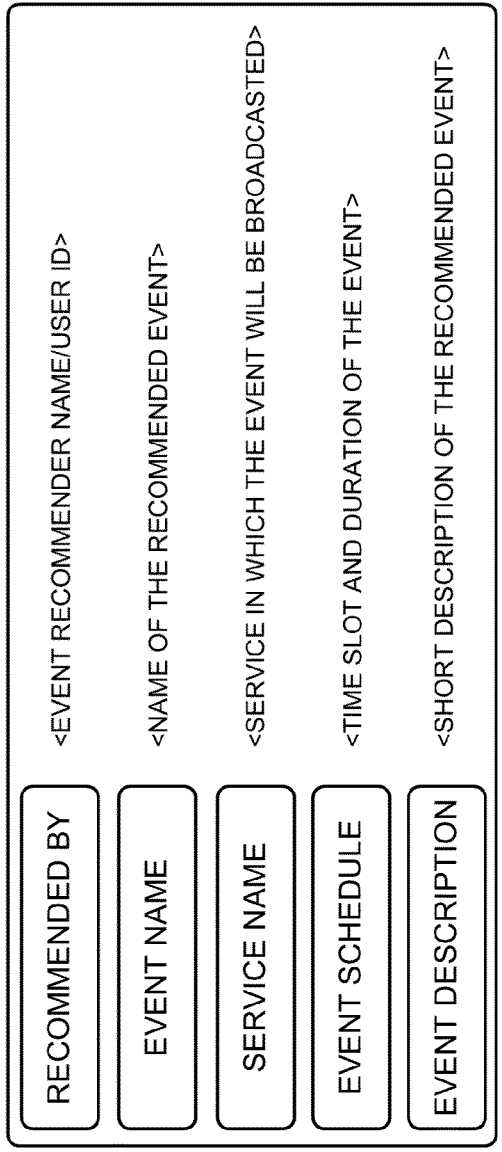
FIG. 2 illustrates an exemplary message format according to an exemplary embodiment of the present disclosure.

FIG. 2 illustrates an exemplary message 200 for an event recommendation message transmitted by STB 110 to mobile device 118. As discussed above, when STB 110 receives a share event request from user 102, it may collect event information about a program or broadcast event from an Event Information Table (EIT) or an EPG and incorporate such event information into a message 200. In one embodiment, an event information collector module on the STB 110 may prepare the message 200. The EIT may include metadata received with TV signals for a broadcast event or program and may be stored in STB 110. The message 200 may include information such as information about the recommender, name of the recommended broadcast event or program, name of the service in which the broadcast event will be broadcasted, time slot and duration of the event, and a short description of the recommended event. The short description may include information about the event such as genre, actor, etc. It will be noted that one or more of these exemplary details may be included in message 200.

Figure 4:
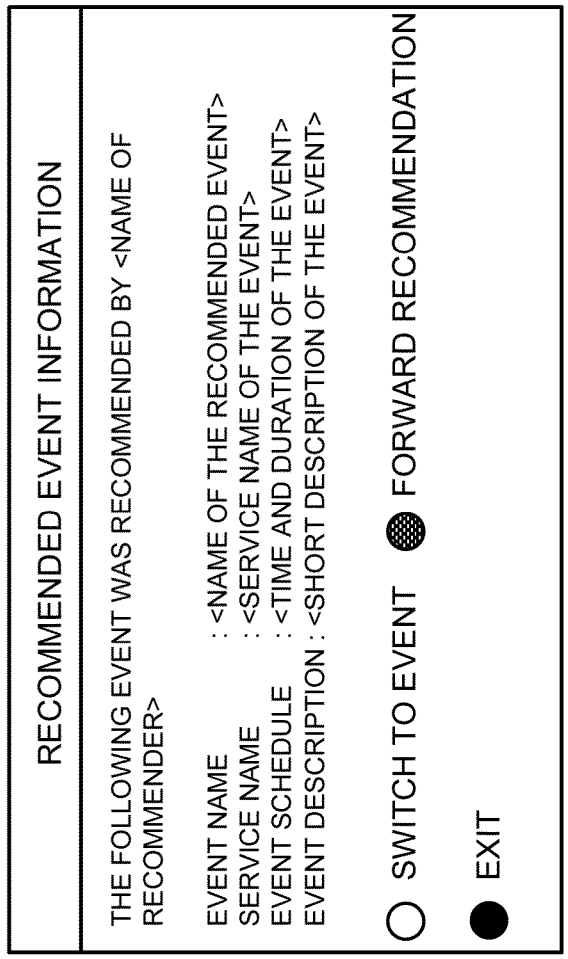
FIG. 4 illustrates another exemplary message displayed on a DTV on the recipient side in accordance with an exemplary embodiment of the present disclosure.

FIG. 3 illustrates an exemplary event recommendation pop up message 300 displayed on DTV 108. Message 300 may be displayed when STB 112 receives a recommendation message 200 from mobile device 120. STB 112 may generate the display of message 300, with the message positioned so that the currently watched view for user 104 is not obscured. For example, message 300 may be displayed on a service banner or crawl area on the screen of DTV 108. Exemplarily, message 300 may provide user 104 an option to confirm if the user wants to view the received event recommendation message 200. For example, message 300 may display "Do you want to view the recommendation?" along with relevant options "Yes" and "No". If user 104 selects "Yes", event information included in message 200 may be displayed along with relevant options as shown in FIG. 4 and FIG. 5, as discussed below. If user 104 selects "No", message 200 may be discarded or may be marked read for future viewing.

FIG. 4 illustrates an exemplary message 400 generated by STB 112 and displayed on DTV 108 if user 104 selects "Yes" for message 300 and the recommended event is an ongoing event. It will be noted that it is not necessary that message 300 be displayed prior to message 400 being displayed. In an exemplary embodiment, STB 112 may display message 400 on DTV 108 if a message 200 is received from mobile device 120 without asking for user 104's confirmation to display the message. In addition to displaying all or part of the information included in message 200, message 400 may provide user 104 with options to switch to the recommended event, forward the received recommendation, and/or exit message 400. If user 104 selects to forward the received recommendation to a contact of user 104, STB 112 may initiate the necessary steps for forwarding the recommendation that are similar to the steps discussed earlier with reference to FIG. 1.

FIG. 5 illustrates an exemplary message 500 generated by STB 112 and displayed on DTV 108 if user 104 selects "Yes" for message 300 and the recommended event is a future event. It will be noted that it is not necessary that message 300 be displayed prior to message 500 being displayed. In an exemplary embodiment, STB 112 may display message 500 on DTV 108 if a message 200 is received from mobile device 120 without asking for user 104's confirmation to display the message. In addition to displaying one or more of the information included in message 200, message 500 may provide user 104 with options to set a reminder for the recommended event, record the recommended event, forward the received recommendation, and/or exit message 500. If user 104 selects to forward the received recommendation to a contact of user 104, STB 112 may initiate the necessary steps for forwarding the recommendation that are similar to the steps discussed earlier with reference to FIG. 1.

Figure 6:
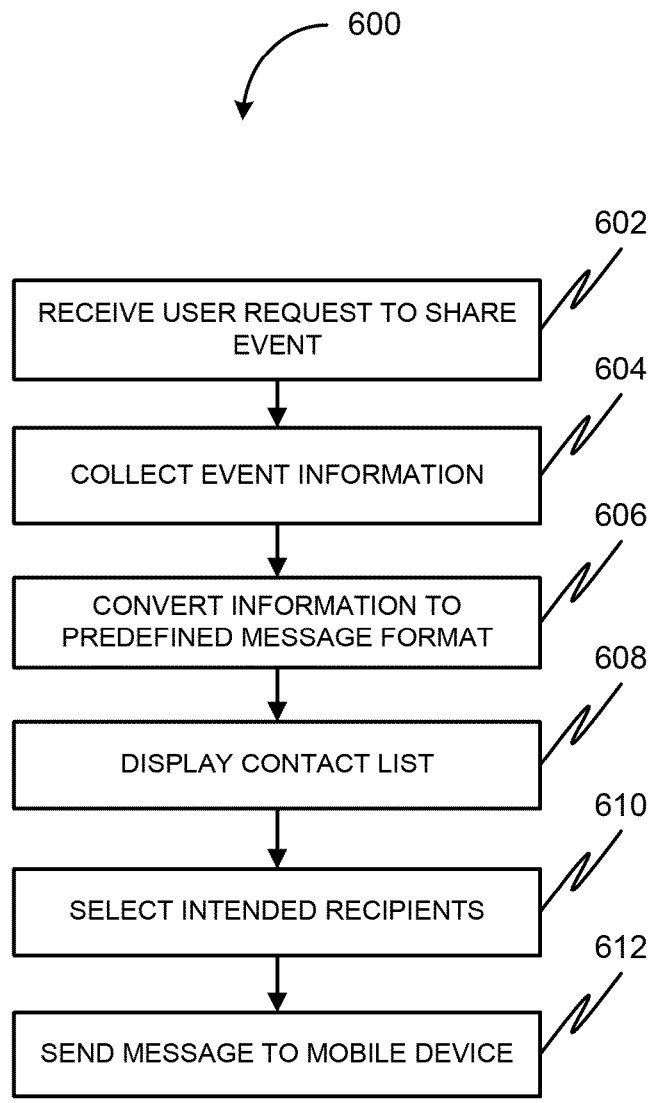
FIG. 6 is an exemplary flow diagram illustrating steps executed by a STB at a sender side in accordance with an exemplary embodiment of the present disclosure.

FIG. 6 is an exemplary flow diagram 600 illustrating steps that may be executed by an exemplary broadcast receiver, such as STB 110 in accordance with one embodiment of the present disclosure. At step 602, STB 110 may receive a request from user 102 to share event information for an event selected by user 102. The request may be received by STB 110 as a result of user 102 pressing a predetermined terminal on remote control device 114 or as a result of selection of an event sharing function through mobile device 118. The selected event may be a currently viewed event or a future event selected from an EPG. At step 604, STB 110 may collect event information for the selected event from the EIT and create a message (for example, message 200) at step 606 that includes the event information. STB 110 may display a contact list on DTV 106 at step 608. As part of step 608, STB 110 may contact mobile device 118 to either download the contact list or update an existing contact list. At step 610, STB 110 may receive selection of intended recipient(s) or pre-defined groups from the displayed contact list. Optionally, STB 110 may also receive in step 610 a command to send the event recommendation message to the selected recipients. STB 110 may transmit the message (for example, message 200) to mobile device 118 over a short range communication link at step 612 along with information on the selected recipients.

Figure 7:
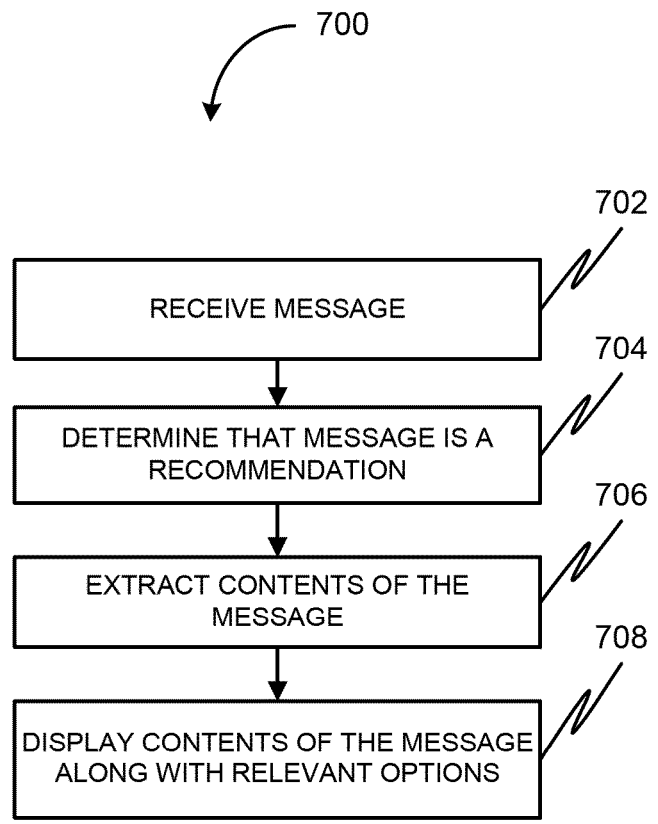
FIG. 7 is an exemplary flow diagram illustrating steps executed by a STB on the recipient side in accordance with an exemplary embodiment of the present disclosure.

FIG. 7 is an exemplary flow diagram 700 illustrating steps that may be executed by an exemplary broadcast receiver, such as STB 112, on the recipient side. At step 702, STB 112 may receive a message (for example, message 200) from mobile device 120 over a short range communication link including but not limited to a BLUETOOTH™ link, a ZIG- BEE™ link, and a short length data cable. At step 704, STB 112 may determine if the message is a recommendation, and on determining that the message is a recommendation, STB 112 may extract contents of the message at step 706. A message may be determined to be a recommendation message based on one or more attributes or identifiers associated with the message as explained in conjunction with FIG. 1. At step 708, the contents of the message may be displayed on DTV 108 in one of one or more predefined message formats (for example, message 400 or message 500). In some embodiments, confirmation may be received from the user prior to displaying contents of the message in a predefined format. For example, message 300 may be displayed to the user to seek confirmation from the user prior to displaying the contents of the message.

Figure 8:
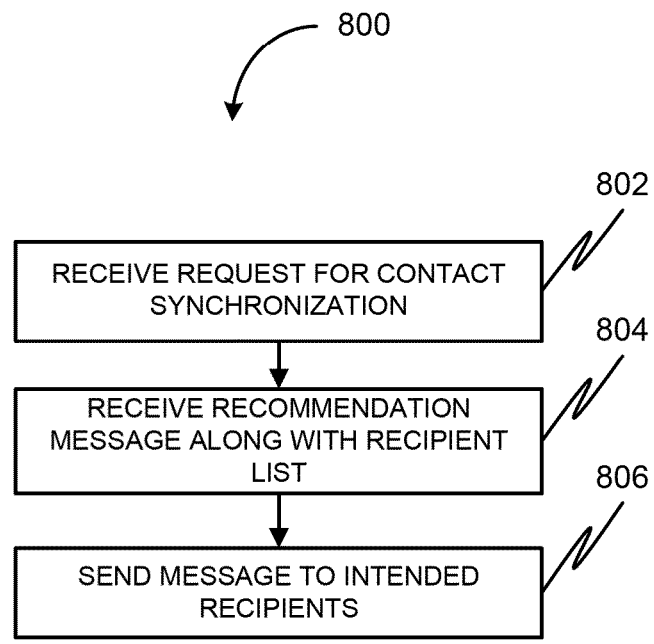
FIG. 8 is an exemplary flow diagram illustrating steps executed by a mobile device on the sender side in accordance with an exemplary embodiment of the present disclosure.

FIG. 8 is an exemplary flow diagram 800 illustrating steps that may be executed by an exemplary mobile device, such as mobile device 118 on the sender side. At step 802, mobile device 118 may receive a request from STB 110 for updates in the contact list stored in STB 110. Exemplarily, mobile device 118 may receive the request using PBAP. When the request is received for the first time, mobile device 118 may synchronize the full contact list with STB 110. For future requests, mobile device 118 may only synchronize updates in the contact list. At step 804, mobile device 118 may receive an event recommendation message (for example, message 200) along with a recipient list from STB 110 via MAP. In response, mobile device 118 may automatically transmit the received event recommendation message to the intended recipients at step 806. Exemplarily, mobile device 118 may transmit the event recommendation message as a short message using Short Messaging Service (SMS), as an e-mail, as an instant message, etc.

Figure 9:
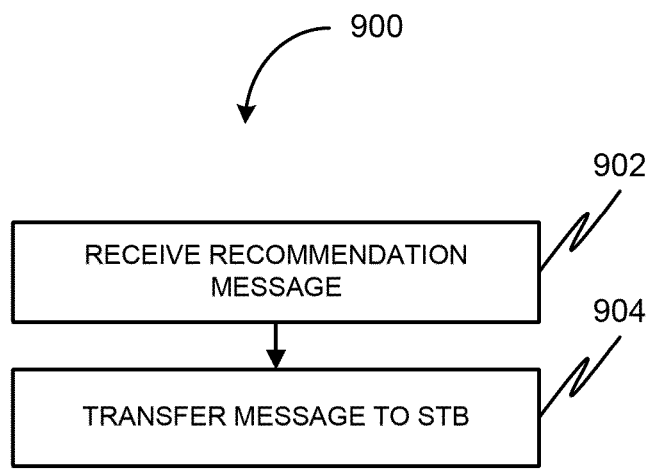
FIG. 9 is an exemplary flow diagram illustrating steps executed by a mobile device on the recipient side in accordance with an exemplary embodiment of the present disclosure.

FIG. 9 is an exemplary flow diagram 900 that illustrates steps that may be executed by mobile device 120 on the recipient side. At step 902, mobile device 120 may receive an event recommendation message (for example, message 200) from mobile device 118, and it may transfer the received message to STB 112 via MAP in step 904. It will be noted that exemplarily mobile devices 118 and 120 may execute the steps illustrated in FIGS. 8 and 9 using application code running on mobile devices 118 and 120, without any manual intervention.

Figure 10:
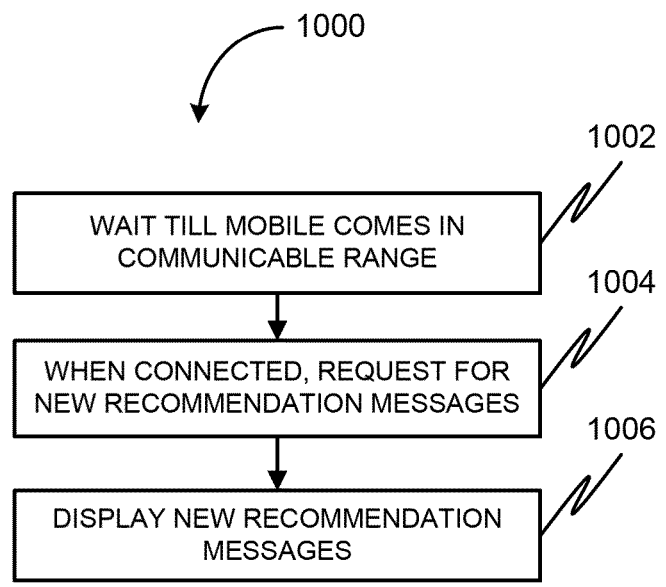
FIG. 10 is another exemplary flow diagram illustrating steps executed by a STB on the recipient side in accordance with an exemplary embodiment of the present disclosure.

FIG. 10 is an exemplary flow diagram 1000 illustrating steps that may be executed by STB 112 when STB 112 is unable to receive any new event recommendation messages from mobile device 120 because mobile device 120 is not within range of STB 112 or because mobile device 120 is switched OFF or a communication interface between mobile device 120 and STB 112 is switched OFF. At step 1002, STB 112 may wait until mobile device 120 comes within range. For example, for BLUETOOTH™ the communicable range may be up to 30 meters. When mobile device 120 comes within range, STB 112 may request delivery of new recommendation messages at step 1004. At step 1006, STB 112 may receive the new recommendation messages, which may then be displayed on DTV 108 as explained in conjunction with FIG. 7.

Figure 11:
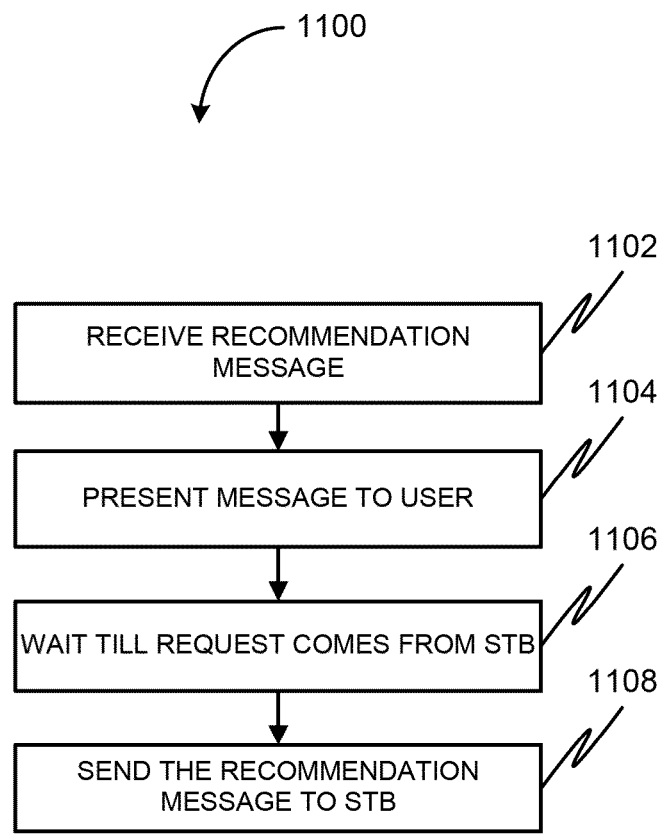
FIG. 11 is another exemplary flow diagram illustrating steps executed by a mobile device on the recipient side in accordance with an exemplary embodiment of the present disclosure.

FIG. 11 is an exemplary flow diagram 1100 illustrating steps executed by mobile device 120 when mobile device 120 is not within range of STB 112 and a recommendation message is received from mobile device 118. At step 1102, mobile device 120 may receive a recommendation message from mobile device 118 and may present the message to user 104 as a normal SMS or instant message or email at step 1104. Next, mobile device 120 may wait until a request is received from STB 112 to forward recommendation messages at step 1106. At step 1108, the recommendation message(s) may be sent to STB 112.

Each of the steps in the machine algorithms described in FIGS. 6-11 may be embodied as computer-readable instructions or code and stored in a non-transitory computer-readable storage medium for execution by a computer. Further, it will be noted that the order of steps in these algorithms may be changed, or various steps in these algorithms may be omitted. In various exemplary embodiments discussed above, each of mobile devices 118, 120, STBs 110, 112, and DTVS 106, 108 may include one or more processors. Each of these devices may also include a main memory, for example, random access memory (RAM), and may include a secondary memory. Secondary memory may include, for example, a hard disk drive and/or a removable storage drive, representing a magnetic tape drive, an optical disk drive, CD/DVD drive, etc. The removable storage drive may read from and/or write to a removable storage unit in a well-known manner. Removable storage unit may represent a magnetic tape, optical disk, or other computer-readable storage medium that is read by and written to by removable storage drive. As will be appreciated, the removable storage unit may represent a computer-readable medium having stored therein computer programs, sets of instructions, code, or data to be executed by the processor(s).

Other embodiments of the present disclosure will be apparent to those skilled in the art from consideration of the specification and practice of the embodiments disclosed herein. It is intended that the specification and examples be considered as exemplary only, with a true scope and spirit of the disclosure being indicated by the following claims.

What is claimed is:

1. A broadcast receiver comprising:
at least one processor; and
a memory storing instructions to be executed by the at least one processor, wherein the at least one processor is configured by the instructions to:
collect event information for a broadcast event after receiving a command from a user;
create a message that includes the event information;
display a contact list of the user after receiving the command;
receive selection of at least one contact from the contact list;
detect whether a mobile device is within a predetermined communication range;
store the message until the mobile device is within the predetermined communication range; and
transmit the message and information on the at least one contact to the mobile device over a short range communication link when the mobile device is within the predetermined communication range.

2. The broadcast receiver of claim 1, wherein the at least one processor is further configured to retrieve the contact list from the mobile device over the short range communication link.

3. The broadcast receiver of claim 1, wherein the short range communication link comprises at least one of a BLUETOOTH™ link, a ZIGBEE™ link, a Wi-Fi Direct link, and a data cable.

4. The broadcast receiver of claim 1, wherein the message includes at least one of identifying information for the user, event name, an event schedule, and an event description.

5. The broadcast receiver of claim 1, wherein the at least one processor is further configured to synchronize the contact list with a second contact list stored in the mobile device after receiving the command from the user but prior to displaying the contact list.

6. A broadcast receiver comprising:
at least one processor; and
a memory storing instructions that, when executed by the at least one processor, causes the at least one processor to perform operations comprising:
receiving a message from a mobile device over a short range communication link, wherein the message comprises event information for a broadcast event;
determining whether the message is a recommendation;
extracting contents of the message in response to determining that the message is a recommendation; and
displaying the contents of the message on a television display in a predefined format.

7. The broadcast receiver of claim 6, wherein the short range communication link comprises at least one of a BLUETOOTH™ link, a ZIGBEE™ link, a Wi-Fi Direct link, and a data cable.

8. The broadcast receiver of claim 6, wherein the at least one processor is further configured to receive confirmation from a user prior to displaying the message on the television display.

9. The broadcast receiver of claim 6, wherein the message includes at least one of identifying information for a user, event name, an event schedule, and an event description.

10. The broadcast receiver of claim 6, wherein the at least one processor is configured to determine that the message is a recommendation based on at least one of an attribute associated with the message, an identifier associated with the message or a type associated with the message.

11. A computer-implemented method for enabling sharing of event information, the method comprising:
collecting event information for a broadcast event after receiving a command from a user;
creating a message that includes the event information;
displaying a contact list of the user after receiving the command;
receiving selection of at least one contact from the contact list;
detecting whether a mobile device is within a predetermined communication range;
storing the message until the mobile device is within the predetermined communication range; and
transmitting the message and information on the at least one contact to the mobile device over a short range communication link when the mobile device is within the predetermined communication range.

12. The method of claim 11, further comprising retrieving the contact list from the mobile device over the short range communication link after receiving the command.

13. The method of claim 11, wherein the mobile device of the user automatically forwards the message to a mobile device of each of the at least one contact.

14. The method of claim 11, wherein the short range communication link comprises at least one of a BLUETOOTH™ link, a ZIGBEE™ link, a Wi-Fi Direct link, and a data cable.

15. The method of claim 11, wherein the message includes at least one of identifying information for the user, event name, an event schedule, and an event description.

16. The method of claim 11, further comprising synchronizing the contact list with a second contact list stored in the mobile device after receiving the command from the user but prior to displaying the contact list.

17. A method for consuming shared event information, the method comprising:

receiving a message from a mobile device over a short range communication link, wherein the message comprises event information for a broadcast event;
determining, by a processor, whether the message is a recommendation;
extracting, by the processor, contents of the message in response to determining the message is a recommendation; and
displaying the contents of the message on a television display in a predefined format.

18. The method of claim 17, wherein the short range communication link comprises at least one of a BLUETOOTH™ link, a ZIGBEE™ link, a Wi-Fi Direct link, and a data cable.

19. The method of claim 17, further comprising receiving confirmation from a user prior to displaying the message on the television display.

20. The method of claim 17, wherein the message includes at least one of identifying information for a user, event name, an event schedule, and an event description.

21. The method of claim 17, wherein determining that the message is a recommendation is based on at least one of an attribute associated with the message, an identifier associated with the message or a type associated with the message.

22. A non-transitory computer-readable storage medium storing instructions that, when executed by a processor, enable the processor to implement a method for enabling sharing of event information, the method comprising:
collecting event information for a broadcast event after receiving a command from a user;
creating a message that includes the event information;
displaying a contact list of the user after receiving the command;
receiving selection of at least one contact from the contact list;
detecting whether a mobile device is within a predetermined communication range;
storing the message until the mobile device is within the predetermined communication range; and
transmitting the message and information on the at least one contact to the mobile device over a short range communication link when the mobile device is within the predetermined communication range.

23. The non-transitory computer-readable storage medium of claim 22, wherein the method further comprises retrieving the contact list from the mobile device over the short range communication link after receiving the command.

24. The non-transitory computer-readable storage medium of claim 22, wherein the message includes at least one of identifying information for the user, event name, an event schedule, and an event description.

25. The non-transitory computer-readable storage medium of claim 22, wherein the method further comprises synchronizing the contact list with a second contact list stored in the mobile device after receiving the command from the user but prior to displaying the contact list.

26. A non-transitory computer-readable storage medium storing instructions that, when executed by a processor, enable the processor to display shared event information on a television display, the method comprising:
receiving a message from a mobile device over a short range communication link, wherein the message comprises event information for a broadcast event;
determining, by a processor, whether the message is a recommendation;
extracting, by the processor, contents of the message in response to determining that the message is a recommendation; and displaying the contents of the message on a television display in a predefined format.

27. The non-transitory computer-readable storage medium of claim 26, wherein the short range communication link comprises at least one of a BLUETOOTH™ link, a ZIGBEE™ link, a Wi-Fi Direct link, and a data cable.

28. The non-transitory computer-readable storage medium of claim 26, wherein the method further comprises receiving confirmation from a user prior to displaying the message on the television display.

29. The non-transitory computer-readable storage medium of claim 26, wherein determining that the message is a recommendation is based on at least one of an attribute associated with the message, an identifier associated with the message or a type associated with the message.

* * * * *